United States Patent
Borras-Chia et al.

(10) Patent No.: US 6,832,074 B2
(45) Date of Patent: Dec. 14, 2004

(54) METHOD AND SYSTEM FOR REAL TIME CELLULAR NETWORK CONFIGURATION

(75) Inventors: Joan Borras-Chia, Vallbona d'Anoia (ES); Howard Lemberg, Bernardsville, NJ (US); Robert White, Morristownship, NJ (US); Joseph Wilkes, Middletown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 32 days.

(21) Appl. No.: 10/287,086

(22) Filed: Nov. 4, 2002

(65) Prior Publication Data

US 2004/0203459 A1 Oct. 14, 2004

(51) Int. Cl.$^7$ ................................................ H04B 17/00
(52) U.S. Cl. ..................... 455/67.13; 455/62; 455/63.1; 455/63.2; 455/67.11; 455/446; 455/447; 455/452.1; 455/450
(58) Field of Search .............................. 455/67.13, 450, 455/456.2, 428, 446, 447, 452.1, 67.11, 63.1, 62, 63.2

(56) References Cited

U.S. PATENT DOCUMENTS

| | | | |
|---|---|---|---|
| 5,212,831 A | | 5/1993 | Chuang et al. ............ 455/54.1 |
| 5,475,868 A | * | 12/1995 | Duque-Anton et al. ....... 455/62 |
| 5,854,981 A | * | 12/1998 | Wallstedt et al. ........... 455/439 |
| 5,878,328 A | * | 3/1999 | Chawla et al. ........... 455/67.11 |
| 5,966,657 A | | 10/1999 | Sporre ........................ 455/425 |
| 6,032,045 A | * | 2/2000 | Mimura ...................... 455/446 |
| 6,049,717 A | * | 4/2000 | Dufour et al. .............. 455/446 |
| 6,178,326 B1 | * | 1/2001 | Kalliokulju ................. 455/437 |
| 6,195,554 B1 | * | 2/2001 | H'mimy et al. ............ 455/450 |
| 6,240,275 B1 | * | 5/2001 | H'Mimy et al. .............. 455/62 |
| 6,349,207 B1 | * | 2/2002 | Monot et al. ............... 455/423 |
| 6,473,623 B1 | * | 10/2002 | Benveniste ................. 455/522 |
| 6,480,718 B1 | * | 11/2002 | Tse ............................ 455/446 |
| 6,487,414 B1 | * | 11/2002 | Tanay et al. ................ 455/450 |
| 6,496,700 B1 | * | 12/2002 | Chawla et al. ........... 455/435.2 |
| 6,556,829 B1 | * | 4/2003 | Persson ...................... 455/437 |
| 6,587,690 B1 | * | 7/2003 | Di Huo et al. ............. 455/446 |
| 6,620,014 B1 | * | 9/2003 | Lindgren .................... 455/446 |
| 6,650,872 B1 | * | 11/2003 | Karlsson .................... 370/329 |

* cited by examiner

*Primary Examiner*—Marceau Milord
(74) *Attorney, Agent, or Firm*—Joseph Giordano; James W. Falk

(57) ABSTRACT

A method and system for automatically configuring the frequency allocation within a cellular system or network. The method requires the collection of measurements from different parts of a cellular network, generating statistics from these measurements, and combining these statistics with inventory, propagation and geographic data. The combined data is used as input to a frequency allocation algorithm. As a result, the allocation algorithm produces a frequency configuration set, a quality measure of the configuration proposed and/or a set of recommendations that is fed back to the cellular base stations to re-allocate the frequency usage in a plurality of cells.

7 Claims, 3 Drawing Sheets

Input the frequency allocations — 301
and received signal strength indicator (RSSI) for all base stations — 316
  1. While seed I is less then Maximum Number of Seeds — 314
    2. While run J is less than Maximum Run Steps — 315
      3. For all K and all m 304 —         4. Compute the Interference on Transceiver k (I1k) at frequency m from all Transceivers that are not the same as k 305 —         5. Compute the Interference from Transceiver k (I2k) at frequency m to all Transceivers that are not the same as k 6. For Transceiver k at frequency m, sum the total Interference
306 —       (Itot_k) equal to the sum of the Interference on Transceiver k (I1k) at frequency m and from Transceiver k (I2k) at frequency m 307 —     7. Store all calculated values
      8. End loop for all k and m
309 —     9. Pick a new Transceiver Randomly
      10. Pick a frequency (freqb) where Itot is a minimum — 310
      11. Is new frequency (freqb) the same as the currently allocated frequency (freq_alloc)?
        12. If yes
311 —         13. Do all Transceivers have the best frequency?
          14. If no go to step 9
          15. If yes have all seeds and runs been performed
            16. If yes END
            17. If no go to step 1
312 —       18. If no Does the new frequency meet all of the frequency allocation rules?
        19. If no go to step 9
      313 — 20. If yes store freqb for Transceiver
      21. Increment J
    22. End loop on J
    23. Increment I
  24. End loop on I

FIGURE 3

METHOD AND SYSTEM FOR REAL TIME CELLULAR NETWORK CONFIGURATION

BACKGROUND OF THE INVENTION

As wireless communications become more widely used, the demand for limited wireless resources, such as the finite number of frequency bands, time divisions, and/or identifying codes (collectively referred to herein as "channels") have increased significantly. It should be appreciated that channels may be distinguishable based on the particular air interface standard implemented such as the frequency bands of frequency division multiple access (FDMA), time slots of time division multiple access (TDMA), codes (pseudo random, Walsh, Orthogonal Variable Spreading Factor, etc.) of code division multiple access (CDMA), and the like. In order to more efficiently use these available resources, wireless communication systems typically divide a geographic area into multiple overlapping coverage cells, which are each served by a base station. Each base station typically comprises a tower, one or more antenna, and radio equipment to allow wireless communication devices to connect with the network side of a wireless communications link.

The planning process which defines the deployment and growth of mobile radio networks with respect to forecasted demand usually precedes their operation and management. The planning department uses predictions of traffic and propagation environment to determine the adequate placement of base stations (BTSs), each having a plurality of transceivers, in the intended service area, as well as their configuration. This configuration encompasses issues like power class, antenna type, antenna pointing, or frequency plan, and it results in a large number of parameters that need to be set. Some of these parameters cannot be easily changed once a decision is made (for instance, changing a base station location once the tower is built), whereas other parameters allow changes through simple software updates (for instance, changing the carrier frequency).

Once the planning department has decided on a configuration for the service area, the operations department deploys the plan and the system can go live. At this stage, actual performance measurements can be collected (either through drive-tests, handset measurements, or switch statistics) and fed back to the planning department to validate the predictions. If discrepancies are found (usually in the form of impaired service quality), the planned configuration is fine-tuned and a new configuration is returned to the operations department for deployment. The fine-tuning process is iterated periodically to improve system performance and also to track any changes (for instance, an unexpected increase in volume of calls) that would require a major configuration update.

In any radio mobile networks that rely on frequency reuse, one of the key parameters that need to be optimized is the set of carrier frequencies allocated to each BTS. The reason for the need to allocate frequencies in these networks is that frequencies cannot be universally reused at each BTS without incurring unacceptable interference levels. The license granted a cellular system operator is limited to a finite number of carrier frequencies for use by that operator. Therefore a decision has to be made as to which frequencies can be used in which BTSs so that the interference levels provide acceptable quality, while at the same time maximizing capacity per carrier frequency (by reusing the frequencies as tightly as possible).

Assuming that the number of frequencies for each BTS in a set has already been defined through traffic engineering dimensioning, the frequency allocation problem (FAP) can be defined as the allocation of a finite set of frequencies to BTSs such that 1) each BTS gets the required number of frequencies, 2) a set of frequency separation constraints is satisfied, and 3) a certain cost function (usually an aggregate interference measure) is minimized. The frequency separation constraints preclude frequency combinations that are known to generate excessive interference (like using adjacent frequencies in the same BTS), or that cannot be used due to regulations or agreements with other operators (like in country border areas). A first approximation to an automatic frequency allocation system can be found in U.S. Pat. No. 5,212,831 by Chuang and Sollenberger, entitled "Method and apparatus for autonomous adaptive frequency assignment in TDMA portable radio systems", where BTSs choose the frequency to use based on downlink measurements performed at the very same BTS. The drawbacks of this approach are that the BTS has to stop operation to be able to perform the measurements, the antennas have to be omnidirectional to assure algorithm convergence and to avoid temporary service disruption in other base stations, and the configuration converges to a local optimum (that is, a solution that is the optimum in a certain neighborhood of feasible solutions, but that is not optimum over the whole set of feasible solutions).

Another solution proposed in the prior art is described in U.S. Pat. No. 5,966,657 by Sporre, entitled "Method and System for Radio Frequency Measurements and Automatic Frequency Planning in Cellular Radio System." In this solution, the BTS sends a message to the mobile stations within its cellular area telling them on which frequencies to measure the signal strength. The mobile station then measures the signal strength for each of the selected frequencies. The mobile stations then report back to their base stations the measured signal strength levels. The measured signal strengths for each frequency measured at the mobile station is combined with the signal strength for measure for each frequency at the base station. A composite signal strength for each frequency is calculated. The composite signal strengths for each carrier frequency are then used by the cellular system to determine whether any of the non-allocated frequencies are less interfered with than the allocated frequencies. The system then uses this information to update the system frequency plan to improve the quality of service within any cell. However, this system suffers from the fact that the process only uses measured data from a single cell area and therefore produces an optimized frequency selection for a single cell; in other words a frequency allocation that is locally optimized. In addition, because the composite signal strength for any one frequency combines the signal strength measured both at the mobile station and the base station, the composite signal does not, in application, provide a valid measure of interference in systems with sectorized antennas. It only provides an accurate local optimum in systems having omnidirectional BTSBTS antennae.

Therefore it is an object of the present invention to obtain a frequency allocation for a plurality of cells that provide a system-wide optimum that overcomes the inadequacies and deficiencies of the prior art.

SUMMARY OF THE INVENTION

Our invention is a method and system for collecting measurements from different parts of a cellular network, generating statistics from these measurements, and combining these statistics with inventory, propagation and geographic data. The combined data is used as input to a frequency allocation algorithm. As a result, the allocation algorithm produces a frequency configuration set, a quality measure of the configuration proposed and/or a set of recommendations that is fed back to the cellular base stations to re-allocate the frequency usage in a plurality of cells.

BRIEF DESCRIPTION OF THE DRAWINGS

FIG. 3 depicts example pseudo-code implementing the frequency allocation algorithm in accordance with our inventive method.

DETAILED DESCRIPTION

Figure 1:
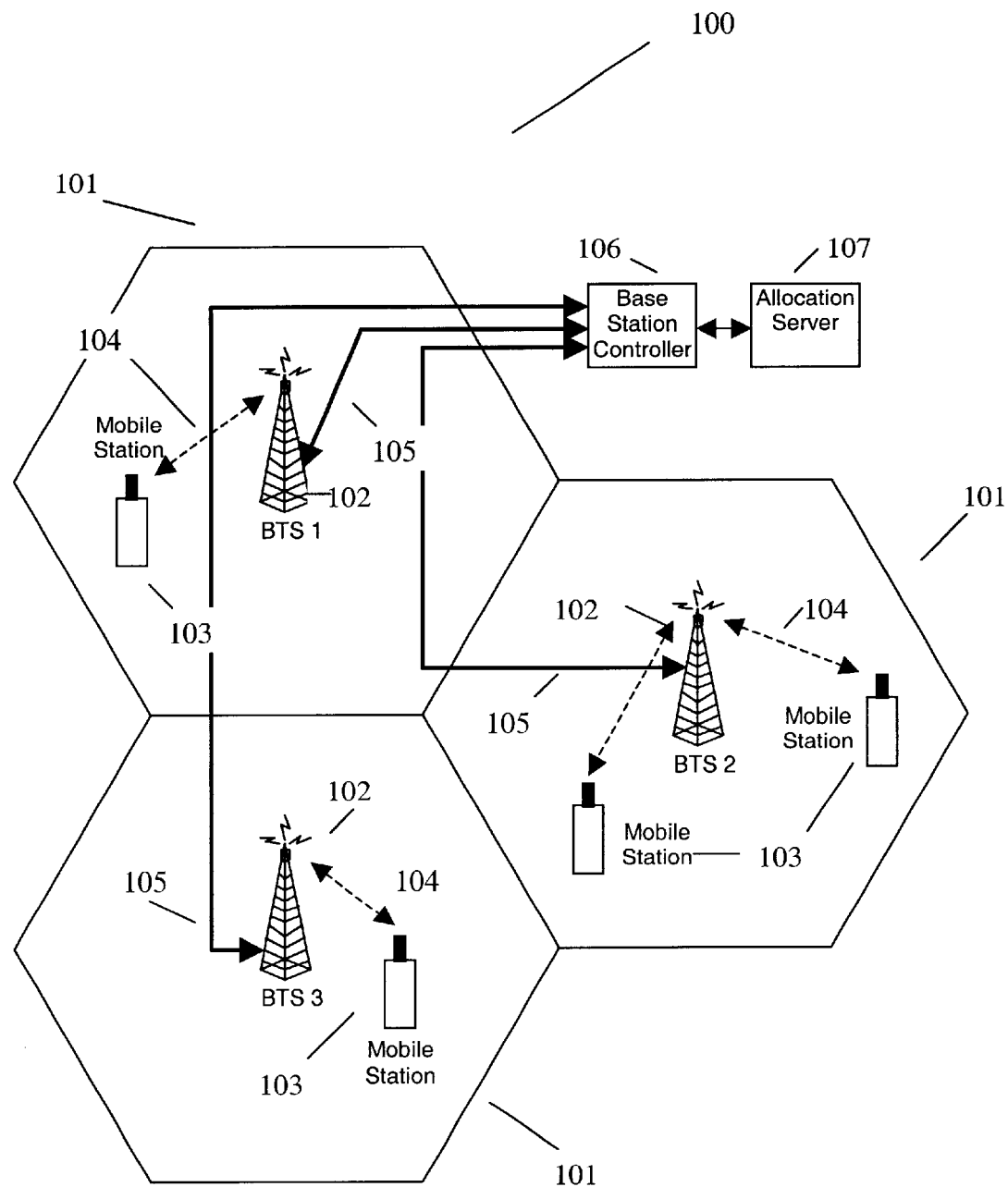
FIG. 1 illustrates one embodiment of our invention.

Our inventive system is best understood by considering the simplified cellular system depicted in FIG. 1. This cellular system is comprised of a plurality of transmission area "cells" cells 101. Within each cell area 101 there is a Base Station (BTS) 102, also known in the art as a cellular base station and including a plurality of transceivers; the BTS 102 is in communication with the mobile stations 103 in their cell area 101. In our invention, "mobile stations" make measurements of signal strength and/or interference. These "mobile stations" include, but are not limited to, cellular portable telephones, remote sensors, and measurement devices that may be mounted at, or integrated with, the BTS sites or other locations. These mobile stations 103 make measurements of a number of parameters regarding the radio link 104. The mobile station 103 then sends the measured parameters over the radio link 104 to the BTS 103 that in turn communicates the collected parameter data over the communications links 105 back to a base station controller 106. The base station controller 106 then forwards the collected link data to a an analysis server 107. The analysis server is a computer that executes one or more algorithms for the purpose of optimizing the performance of the overall cellular system 100 by evaluating and selecting an optimum set of parameters to feed back to the base station controller 106. The statistical processing accomplished within server 107 will also encompass the combination of information reported from the various cells 101. The resulting data representation will be passed onto an allocation algorithm, which will process the input data and solve, as an example, the frequency allocation problem (FAP) for the overall system 100. The result of this processing will be a new optimized configuration for the system 100 that will be downloaded to the BTSs 102.

One configuration problem faced by any cellular system is the problem for determining the set of frequencies that provides the system with optimum performance. This frequency allocation problem (FAP) can be attacked directly considering the whole set of frequencies that need to be allocated, but it is usually divided into two problems, one of allocating beacon frequencies (that is, the frequencies that are used as reference to determine coverage area, and that are not power controlled) and one of allocating non-beacon frequencies. The reason for this division is that beacon frequencies usually have more stringent performance requirements, as the whole system operation depends on them. Thus, even though splitting the frequency band into different groups decreases the number of possible combinations to choose from, the usual strategy is to split the band to assure beacon frequency robustness. Once the band is split, each of the two problems is an instance of a FAP, although they might have different cost functions to account for the different requirements (different allowed interference levels, lack of support for power control and synthesized hopping in the case of beacon frequencies, etc.). However, the solution of the two FAP instances usually relies on the same algorithm.

The FAP in its purely mathematical form is a well-known combinatorial optimization problem. Combinatorial optimization problems are concerned with the efficient allocation of limited resources to meet desired objectives when the values of some or all of the variables are restricted to be integral, resulting in a finite (although possibly very large) number of possible choices. The optimization will come from searching and finding the allocation that maximizes or minimizes a function (usually called reward function or cost function, respectively), possibly subject to constraints or penalties. Solving combinatorial optimization problems, i.e. finding an optimal solution to such problems, can be a difficult task. The difficulty arises from the fact that they may have many local optima and finding a global optimum to the problem requires one to prove that a particular solution dominates all feasible combinations. This can be seen with the hill-climbing analogy, which considers the search space as a landscape through which a search algorithm moves towards the highest point, where height corresponds to "closeness" to the optimum. However, a hill-climber can be trapped on a hill that is not a global optimum but a local optimum. In other words, if the search landscape is rugged with a lot of hills (local optima), the algorithm could climb the nearest hill and find that any further movement decreases height and thus remain trapped on this hill, whereas the highest point (global optimum) is actually on another taller hill.

Although there are techniques that can provide exact solutions for the FAP global optimum, the complexity involved usually precludes their utilization especially in real time applications. Thus, local optimum solutions or even solutions that just meet a set of requirements are acceptable most of the time. Local optimum solutions can be obtained using greedy local optimization algorithms (random starting point, moving the search to neighbor points that improve the cost function). "Good" solutions can be found using heuristics solution approaches—i.e. techniques for obtaining "good" but not necessarily optimal solutions quickly and, in general, without any guarantee as to their "closeness" to an optimal solution.

Our invention can accommodate two different modes for completing the FAP: one in which the frequency allocation is changed one frequency at a time (in one BTS at a time) and where the process is iterated over all BTSs in the system (on-line mode); and another mode in which the allocation algorithm is run until a solution is found for the whole system of BTSs, and then it is applied (off-line mode). The on-line mode might require new measurements to be collected after every frequency update and usually converges to a relative local optimum (i.e. our system uses data from across the system and will iterate until a set of local optima are found), but requires only incremental changes to the current configuration. The off-line mode might be able to find better solutions by solving for several local optima and choosing the best, but usually requires a complete overhaul of the configuration and is slower in adapting to changes in the environment. In any case, our invention requires that frequency allocation decisions are based on system-wide measurements, not just measurements collected by one BTS.

Figure 2:
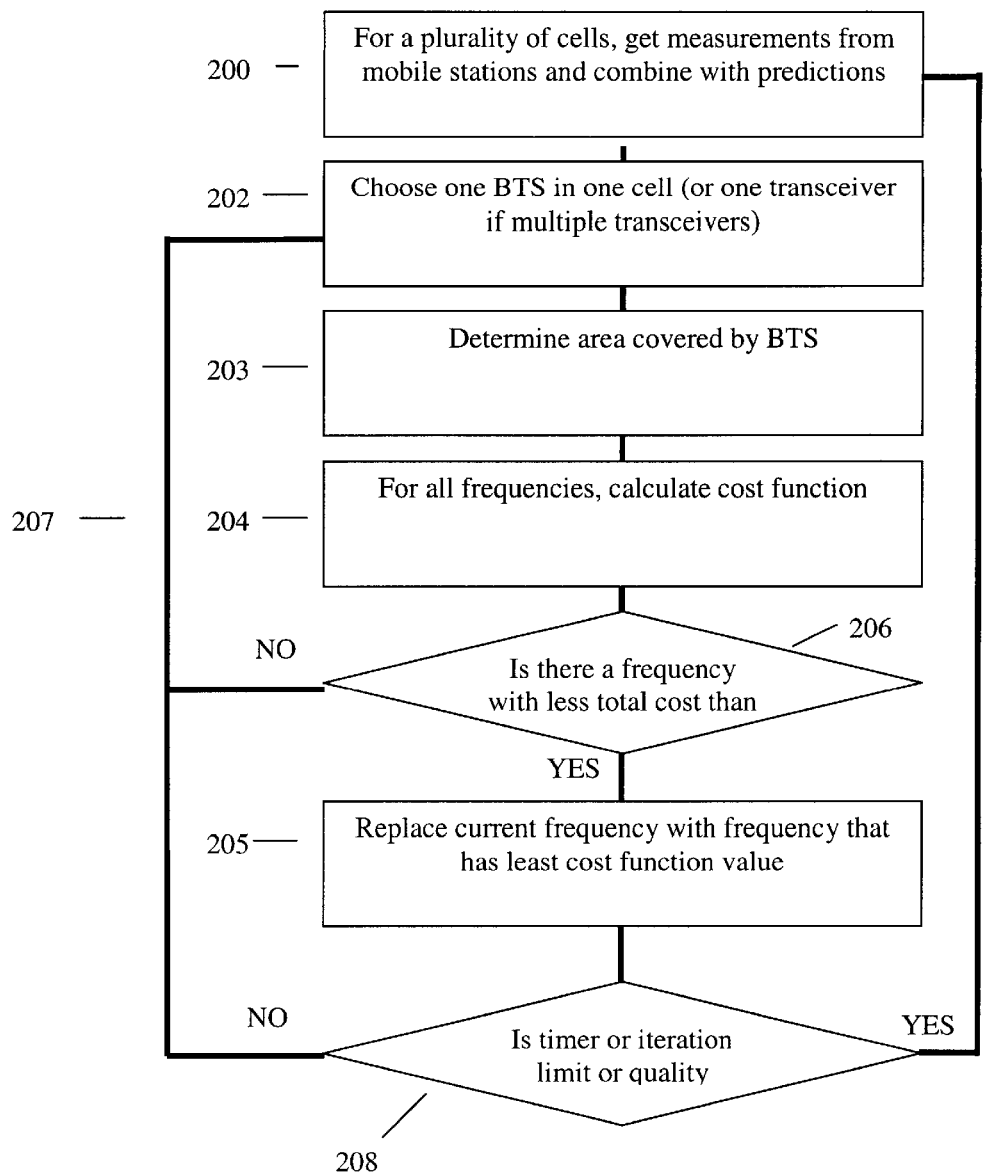
FIG. 2 is a flow diagram of our inventive method

One embodiment of our invention as it applies to a frequency allocation is depicted in the flow diagram of FIG. 2. The first step in our inventive method is the gathering of measurement data 100. The set of measurements that the system could collect range from mobile station measurements of signal strength and signal quality (which are reported back to the BTS), to dropped call rates as reported at the switch in the core network. Then one BTS is selected 202 for frequency allocation optimization 202. Then the area covered by the BTS is determined by using the measured data from the mobile stations and computing signal levels and interference levels for the BTS and applying a minimum signal level and interference level for coverage 203. Current mobile stations collect measurement data usually used by a BTS for handoff determination. Our invention proposes using these measurements to compute at a central location a cost function for all frequencies both allocated and unallocated 204. One example of a cost function is illustrated by FIG. 3 based on calculated interference levels using the previously described method. A decision is then made if there is an unallocated frequency with a cost function less than the cost function for any one of the allocated frequencies 206. If not, then go back to step 202 and choose a new BTS. If yes, then replace the current frequency with the frequency that has a least cost function value 205. If the overall system quality has been met, or if you have exceeded a preset timer for the allocation process, then you return to step 200 and gather new measurements and start the process over. If however, the system optimization has not occurred and the preset processing has not been exceeded then you return to step 202 to select another BTS for frequency allocation.

In the preferred mode, the cost function for frequency allocation can be the calculated interference at one transmitter frequency from all other frequencies received at the mobile station. FIG. 3, shows the pseudo-code for the complete process depicted in FIG. 2 using interference levels as the calculated cost function.

The process for frequency allocation as depicted in FIG. 3 begins with the initialization of variables I and J to zero 301 and the input of the received signal strength measurement indicators (RSSI) for all transceivers in the existing frequency allocation 316. I is a variable representing the number of random network layouts that are to be chosen and examined and it is used to iterate for a system optimum 314. In other word, for each new value of I the system picks a new random system layout. J is the variable used to iterate for a local optimum 315. The maximum values for I and J are chosen based on the experience of the system operator and are chosen to ensure that each run will converge to at least only one local optimum and sufficient runs are done to find a best local optimum.

In step 304, for each value of J and for each frequency m, the process computes the interference at a transceiver k caused by all the other transceivers. In step 305, for each frequency m the process computes the interference caused by transceiver k at all the other transceivers. In step 306 for each transceiver k and frequency m, the total Interference is calculated, which is the sum of the interference levels computed in steps 304 and 305. The interference levels are computed based on signal strengths from all BTSs on the same frequency using techniques that are known to those skilled in the art. Each of these calculated interference values for each transceiver and each frequency are stored in memory 307.

A new transceiver is selected at random, step 309. For the selected transceiver the frequency with the lowest total calculated interference is found, step 310 is the frequency with the lowest total calculated interference the same as the currently allocated frequency, item 11. If yes, item 12, then the process tests to see if all the transceivers have the best frequency, step 311. If not, item 14, then the process returns to step 309 and picks a new transceiver at random. If yes, item 15, then the process checks to see if all seeds and runs have been performed. If yes, item 16, then the system optimum has been found for the given set of measurements. Each run indexed on J finds a local optimum; each run indexed on I finds a new local optimum. If no, item 17, go back to step 314. However, going back to the step of whether the measured frequency is the same as the allocated frequency, step 311, if it is not, item 18, then it is tested to see if it meets all the frequency allocation rules, step 312. (All cellular systems have rules that must be obeyed in assigning frequencies. For example, adjacent frequencies cannot be used on BTSs at the physical location. Adjacent cells must be separated in frequency by two channels. Two cells known to interfere with each other cannot share the same frequency. These rules are specific to a given network deployed in a geographical area and are developed over time as knowledge of the area is gained. The FAP must account for all of these rules when assigning frequencies.) If yes, item 20, then the new frequency is stored as the allocated frequency for the given transceiver, step 313. If not, item 19, then the process returns to step 309 to randomly select a new transceiver.

The forgoing process describes a method for finding a system optimum frequency allocation in a cellular system that does not employ frequency hopping. However, even in systems that use frequency hopping, the frequency allocation problem can still be solved using the method described above. For frequency hopping systems, one cost function is the average interference over all frequencies that are used for hopping.

Our invention is not limited to signal strength measurements and the frequency allocation problem. Our invention addresses the problem of finding, in real time, an optimum system configuration using a centralized server based on measurements collected within each cell serving area. Our inventive system could be used to configure the system using any one or more of the following partial list of possible measurements: (Uplink signal strength, Downlink signal strength, Uplink signal quality, Downlink signal quality, Number of dropped calls per BTS, Number of handover failures per BTS, Pages per Location area per hour, Busy Hour Call Attempts per switch, Handovers per BTS per hour, Unsuccessful Requests for Service, per cause, and Mean call inter-arrival time, base station transmit power levels to determine coverage area).

In addition our invention is not limited by the mechanisms for reporting measurements from the mobile stations to the BTS. They could and are usually built into the BTSs, as they are used for other purposes like handoff management, power control management, or monitoring. Some of the measurements reported may already be statistics, such as usual time averages. However, further statistical processing may be necessary to merge data from a plurality of mobile stations or to summarize data collected over hours, days or weeks. In addition, different weights can be given to measurements collected in different times or places, especially if the measurements are accompanied of timestamps (which indicate the time of measurement) or location data (usually the coordinates of the mobile station from a Global Positioning System device). Data may also be organized so that the allocation algorithm can use it efficiently. Further, measurement data could be combined with predicted data, specially when the availability of measurements is spotty or when the amount of measurements available is not statistically significant.

While it has been illustrated and described what is at present considered to be the preferred embodiments and methods of the present invention, it will be understood by those skilled in the art that various changes and modifications may be made, and equivalents may be substituted for elements thereof without departing from the true scope of the invention. Moreover, it should be appreciated that the present invention may be used for many different applications besides the frequency allocation problem. For example, the system as described can be used to optimize frequency hopping parameters, base station power settings, or the setting of handover control parameters. Therefore it is intended that the invention not be limited to the particular embodiments and methods disclosed herein, but the invention includes all embodiments falling within the scope of the appended claims.

We claim:

1. A method of allocating frequencies in a cellular communication system comprising the steps of:
    receiving from a plurality of mobile stations the measured received signal strength indicators for each frequency available for use by such mobile stations across a plurality of cellular base stations each having a plurality of transceivers;
    calculating a value representing the interference level for each frequency available for use in each of said transceivers in said cellular base stations;
    selecting one transceiver in one of said cellular base stations;
    identifying a frequency with the lowest calculated interference level value for said selected transceiver;
    determining whether said identified frequency is an available frequency for said selected transceiver and, if it is, making said identified frequency the new allocated frequency for said one transceiver; and
    repeating said selecting, identifying, and determining steps for a plurality of said transceivers in said plurality of cellular base stations.

2. A method of allocating frequencies in a cellular communication system comprising the steps of:
    receiving from a plurality of mobile stations the measured received strength indicators for each frequency available for use by such mobile stations across a plurality of cellular base stations each having a plurality of transceivers;
    calculating a value representing the interference level for each frequency available for use in each of said transceivers in said cellular base stations, said calculating step is comprising the steps of:
        calculating a first interference level at a transceiver in one of said cellular base stations for one of said available frequencies caused by all other of said transceivers in said cellular base stations from which measurements have been reported;
        calculating a second interference level value caused by said one transceiver at all other transceivers in said cellular base stations for said one frequency;
        summing the first and second interference level values to create a total interference level value for said one frequency; and
        repeating said calculating a first interference level value, said calculating a second interference level value, and said summing steps for each of said available frequencies;
    selecting a transceiver in one of said cellular base stations;
    identifying a frequency with the lowest calculated interference level value for said selected transceiver;
    determining whether said identified frequency is an available frequency for said selected transceiver and, if it is, making said identified frequency the new allocated frequency for said selected transceiver; and
    repeating said identifying and determining steps for each of said transceivers in said plurality of base stations.

3. The method of claim 2 wherein said step of selecting a transceiver in one of said cellular base stations comprises selecting said selected transceiver at random.

4. A computer program product comprising a computer readable program code means for causing a computer to:
    receive from a plurality of mobile stations the measured received signal strength indicator for each frequency available for use by such mobile stations across a plurality of cellular base stations each having a plurality of transceivers;
    calculate a value representing the interference level for each frequency available for use in each of said transceivers in said cellular base stations;
    store said values in computer memory;
    select, at random, one transceiver in one of said cellular base stations;
    identify a frequency with the lowest calculated interference level value for said selected transceiver;
    determine whether said identified frequency is an available frequency for said selected transceiver and, if it is, making said identified frequency the new allocated frequency; and
    repeating said selecting, identifying, and determining steps for a plurality of said transceivers in said plurality of cellular base stations.

5. A computer program product comprising a computer readable program code means for causing a computer to:
    receive from a plurality of mobile stations the measured received signal strength indicator for each frequency available for use by such mobile stations across a plurality of cellular base stations each having a plurality of transceivers;
    calculate a value representing the interference level for each frequency available for use in each of said transceivers in said cellular base stations, said computer readable program code means for causing the computer to calculate a value representing the interference level for each frequency available further comprising program code to:
        calculate a first interference level value at a transceiver for one of said available frequencies caused by all other of said transceivers in said cellular base stations from which measurements have been reported;
        calculate a second interference level value caused by said transceiver at all other transceivers for said one frequency;
        sum the first and second interference level values to create a total interference level value for said one frequency; and
        repeat the process of calculating a first interference level value, calculating a second interference level value, and summing such values for each of said available frequencies;
    storing said values in computer memory;
    select, at random one transceiver in one of said cellular base stations;
    identify a frequency with the lowest calculated interference level value for said selected transceiver;
    determine whether said identified frequency is an available frequency for said selected transceiver and, if it is, making said identified frequency the new allocated frequency; and repeating said selecting, identifying, and determining steps for a plurality of said transceivers in said plurality of cellular base stations.

6. A method of allocating frequencies in a cellular communication system comprising the steps of:

receiving from a plurality of mobile stations measured received signal strength indicators for each frequency available for use by such mobile stations across a plurality of cellular base stations each having a plurality of transceivers;

calculating a value representing the interference level for each frequency available in each of said transceivers in said cellular base stations, said calculating step comprising:

calculating a first interference level at a transceiver for one of said available frequencies caused by all other of said transceivers in said cellular base stations from which measurements have been reported;

calculating a second interference level value caused by said one transceiver at all the other transceivers for said one frequency;

summing the first and second interference level values to create a total interference level value for said one frequency; and repeating said calculating a first interference level value, said calculating a second interference level value, and said summing steps for each of said available frequencies;

identifying a frequency with the lowest calculated interference level for a plurality of transceivers in said cellular base stations; and determining whether said identified frequencies are available frequencies for individual ones of said plurality of transceivers and, if so, making said identified frequencies the new allocated frequencies for said individual ones of said plurality of transceivers.

7. The method of claim 6 wherein said identifying step identifies a frequency with the lowest calculated interference level for each of said transceivers in said cellular base stations.

* * * * *

UNITED STATES PATENT AND TRADEMARK OFFICE
CERTIFICATE OF CORRECTION

PATENT NO. : 6,832,074 B2  
APPLICATION NO. : 10/287086  
DATED : December 14, 2004  
INVENTOR(S) : Borras-Chia et al.

Page 1 of 1

It is certified that error appears in the above-identified patent and that said Letters Patent is hereby corrected as shown below:

In the Specification

In Column 3, Line 31, delete "BTS 103" and insert -- BTS 102 --, therefor.

In Column 3, Line 35, delete "to a an" and insert -- to an --, therefor.

In the Claims

In Column 8, Line 61, in Claim 5, delete "at random" and insert -- at random, --, therefor.

Signed and Sealed this
Sixteenth Day of December, 2014

Michelle K. Lee
*Deputy Director of the United States Patent and Trademark Office*